United States Patent
Xu et al.

(10) Patent No.: US 9,705,764 B2
(45) Date of Patent: Jul. 11, 2017

(54) SYSTEM AND METHOD FOR EVALUATING PERFORMANCE AND EVOLUTION ABILITY OF NETWORK ADDRESS AND IDENTIFICATION SCHEMES

(71) Applicant: Tsinghua University, Beijing (CN)

(72) Inventors: Ke Xu, Beijing (CN); Liang Zhu, Beijing (CN); Min Zhu, Beijing (CN)

(73) Assignee: Tsinghua Univeristy, Beijing (CN)

( * ) Notice: Subject to any disclaimer, the term of this patent is extended or adjusted under 35 U.S.C. 154(b) by 435 days.

(21) Appl. No.: 14/338,655

(22) Filed: Jul. 23, 2014

(65) Prior Publication Data

US 2015/0032895 A1    Jan. 29, 2015

(30) Foreign Application Priority Data

Jul. 24, 2013  (CN) .......................... 2013 1 0313585

(51) Int. Cl.
  *G06F 15/173*    (2006.01)
  *H04L 12/26*    (2006.01)
  *H04L 12/24*    (2006.01)

(52) U.S. Cl.
  CPC ............ *H04L 43/08* (2013.01); *H04L 41/145* (2013.01); *H04L 43/50* (2013.01); *H04L 41/0866* (2013.01)

(58) Field of Classification Search
  CPC ........ H04L 43/08; H04L 41/145; H04L 43/50
  USPC .......................................... 709/223–224, 226
  See application file for complete search history.

(56) References Cited

U.S. PATENT DOCUMENTS

| | | | |
|---|---|---|---|
| 8,495,072 B1* | 7/2013 | Kapoor | H04L 67/327 707/754 |
| 2007/0101397 A1* | 5/2007 | Aboukarr | H04L 29/12216 725/140 |
| 2010/0211614 A1* | 8/2010 | Stuhec | G06F 17/30731 707/803 |
| 2011/0202989 A1* | 8/2011 | Otranen | H04L 63/0815 726/8 |

* cited by examiner

*Primary Examiner* — Philip B Tran
(74) *Attorney, Agent, or Firm* — Lathrop & Gage LLP

(57) ABSTRACT

In a method, formal descriptions of network address and identification schemes are received. Then validity and completeness of the formal descriptions are verified. The network address and identification schemes are scheduled into a final description after the validity and completeness of the formal descriptions are verified. The final description is resolved into an applicable network address. Then the applicable network address and identification scheme is applied to a test network and the test network runs. The running performance of the test network is measured. The measurements are analyzed and sent to evaluating performance and evolution ability of the network address and identification schemes.

8 Claims, 2 Drawing Sheets

```
<?xml version="1.0" ?>
<xs:schema xmlns:xs= "http://www.w3.org/2001/XMLSchema"
       elementFormDefault= "qualified" >
   <xs:simpleType name= "ipv6_Address" >
       <xs:restriction base= "xs:string" >
           <xs:pattern value= "([A-Fa-f0-9]{1,4}:){7}[A-Fa-f0-9]{1,4}" />
       </xs:restriction>
   </xs:simpleType>
</xs:schema>
```

Fig. 2

Atoms used in ID/LOC mapping

| Atoms | Definitions |
|---|---|
| Resolver (local) | Local resolving server |
| DNS(domain) | Domain server |
| ILMS(s)/ ILMS(r) | One/multi level mapping |
| Get_loc(ID, Resolver (local)) | Get locator from local resolving server |
| Get_ID(FQDN, DNS(domain) ) | Get identifier from domain server |
| Get_Loc(ID, ILMS(s)) | Get locator from mapping server |
| Get_loc(ID, ILMS(r)) | Get identifier iteratively |

Pseudo code of ID/LOC mapping

```
while(Resolver(local))
    If(!Get_loc(ID, Resolver (local)))
        Get_ID(FQDN, DNS(domain) );
        if(ILMS(s) && ILMS(r))
            Get_loc(ID, ILMS(r));
        else
            Get_loc(ID, ILMS(s));
        Return (ID);
```

Fig. 3

SYSTEM AND METHOD FOR EVALUATING PERFORMANCE AND EVOLUTION ABILITY OF NETWORK ADDRESS AND IDENTIFICATION SCHEMES

CROSS-REFERENCE TO RELATED APPLICATION

This application claims all benefits accruing under 35 U.S.C. §119 from China Patent Application No. 201310313585.8, filed on Jul. 24, 2013 in the China Intellectual Property Office, the disclosure of which is incorporated herein by reference.

FIELD

The present disclosure relates to network techniques, and particularly to a system and method for evaluating performance and evolution ability of network address and identification schemes.

BACKGROUND

For decades the Internet has achieved great success. However, with the rapid expansion of Internet scale, traffic, and bandwidth, the security, scalability, and mobility of the current Internet architecture face various challenges. The Internet requires evolution and innovation.

The address and identification scheme including naming and addressing is the most essential and important part of a network because the basic functionalities of a network tightly depend on it. The IP address in the current architecture has dual semantic functions which hindered the Internet from evolution. Therefore, many new address and identification architectures have been proposed. To ensure quality, performance and evolution ability of these new architectures need to be evaluated.

Therefore, it is desirable to provide a system and method for evaluating performance and evolution ability of network address and identification schemes. During the evaluation, the system and method exhibit excellent flexibility and scalability. Multiple address and identification architectures can be deployed on the system and method with specific experiment and evaluation.

SUMMARY

According to an aspect of the present disclosure, a system is provided. The system includes:
a managing and evaluating center, comprising:
an input unit configured for receiving formal descriptions of network address and identification schemes;
a verifying unit in communication with the input unit and configured for verifying validity and completeness of the formal descriptions; and
a scheduling unit in communication with the verifying unit and configured for scheduling the network address and identification schemes into a final description after the validity and completeness of the formal descriptions are verified; and
an evaluating unit;
a control center, comprising:
a script resolving unit in communication with the scheduling unit and configured for resolving the final description into an applicable network address and identification scheme; and
a resource allocating unit;
a test network, the resource allocating unit being in communication with the script resolving unit and the test network, and configured for applying the applicable network address and identification scheme to the test network to run the test network; and
a measurement center, comprising:
a measuring unit in communication with the test network and configured for measuring running performance of the test network; and
an analyzing unit in communication with the measuring unit and the evaluating unit, the analyzing unit being configured for analyzing the measurements and sending the analyzed measurements to the evaluating unit for evaluating performance and evolution ability of the network address and identification schemes.

In one embodiment, the input unit comprises a user interface selected from the group consisting of a keyboard, a mouse, a touch panel, and any combination thereof.

In one embodiment, the network address and identification schemes are written under predetermined standards, and semantics and grammar rules, and the verifying unit verifies the validity and completeness of the formal description according to the predetermined standards, and semantics and grammar rules.

In one embodiment, the control center further comprises a calling unit, and the calling unit is in communication with the script resolving unit and is configured for calling source code to resolve the final description.

In one embodiment, the test network comprises:
a host and switches in communication with the resource allocating unit and is configured for implementing the applicable network address and identification scheme and running to transmit and forward data;
a data base configured for storing data including mapping tables;
a mapping resolver in communication with the host and switches and the database server and configured for mapping addresses with identifiers of the host and the switches using the mapping table; and
cloud in communication with the host and switches, the database server, and the mapping resolver, and configured for providing supports of calculation and storage.

According to another aspect of the present disclosure, a method is provided. The method includes:
receiving formal descriptions of network address and identification schemes;
verifying validity and completeness of the formal descriptions;
scheduling the network address and identification schemes into a final description after the validity and completeness of the formal descriptions are verified;
resolving the final description into an applicable network address;
applying the applicable network address and identification scheme to a test network and the test network running;
measuring running performance of the test network; and
analyzing the measurements and sending the analyzed measurements; and
evaluating performance and evolution ability of the network address and identification schemes based upon the analyzed measurements.

In one embodiment, the network address and identification schemes are written under predetermined standards, and semantics and grammar rules, and the validity and completeness of the formal description are verified according to the predetermined standards, and semantics and grammar rules.

In one embodiment, wherein the network address and identification schemes comprise dynamic operations, the control center further comprises a calling unit, and the calling unit is in communication with the script resolving unit and is configured for calling routines, data structures, object classes, and variables to resolve the final network address and identification scheme.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 2 shows an example of a formal description of IPv6 address scheme.

FIG. 3 shows an example of a Pseudo code for ID/LOC mapping in the network address and identification scheme that identifier and locators are splited.

DETAILED DESCRIPTION

Figure 1:
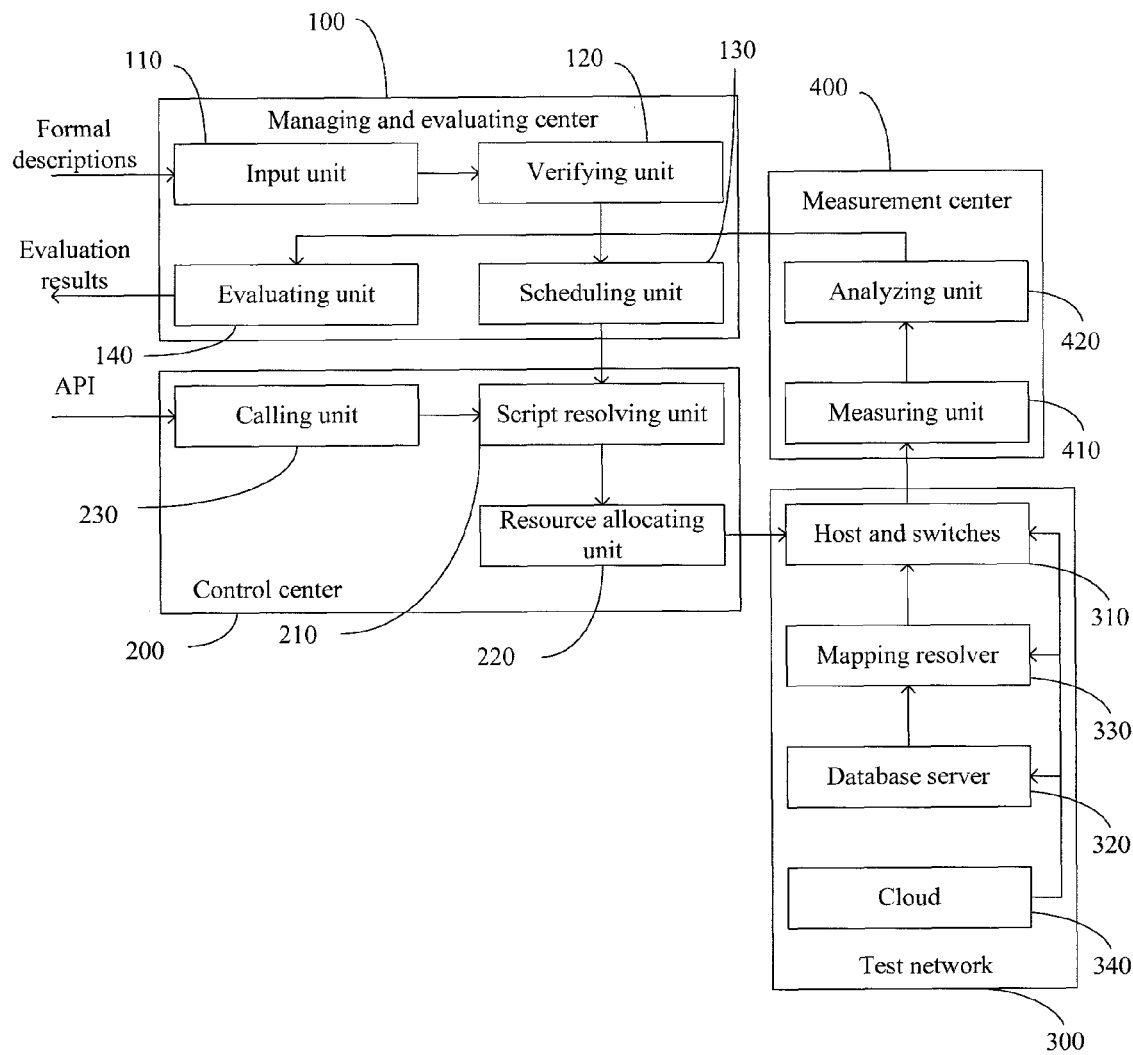
FIG. 1 is a functional block diagram of a system for evaluating network address and identification schemes.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIG. 1, a system 10 for evaluating performance and evolution ability of network address and identification schemes, according to an embodiment, includes a managing and evaluating center 100, a control center 200, a test network 300, and a measurement center 400.

The managing and evaluating center 100 is configured for operating, managing, and scheduling the system 10. In detail, the managing and evaluating center 100 receives formal descriptions of network address and identification schemes, and verifies validity and completeness of the formal descriptions, and outputs evaluation results to the users. The managing and evaluating center 100 deploys the network address and identification scheme of excellent performance to an actual network (not shown). The managing evaluating center 100 also schedules the network address and identification schemes.

In this embodiment, the managing and evaluating center 100 includes an input unit 110, a verifying unit 120, and a scheduling unit 130.

The input unit 110 can be any available user interface, such as a keyboard, a mouse, a touch panel, or any combination thereof. The input unit 110 is configured for receiving the formal description of the network address and identification scheme. FIG. 2 shows an example of the formal description of IPv6 address scheme written in extensible markup language (XML). Each network address and identification scheme can include a network address length, mapping requirements, and security policy. The formal description is written under predetermined standards, and semantics and grammar rules.

The verifying unit 120 is in communication with the input unit 110 and is configured for verifying the validity and completeness of the formal description according to the predetermined standards, and semantics and grammar rules. For example, the verifying unit 120 matches the formal description with the predetermined standards, and semantics and grammar rules to determine the validity and completeness of the formal description.

The scheduling unit 130 is in communication with the verifying unit 120 and is configured for scheduling the network address and identification schemes and allocating network resources and producing a final description.

The control center 200 is in communication with the managing and evaluating center 100 and the test network 300, and is configured for resolving the final description into an applicable network address and identification scheme and applying the applicable network address and identification scheme to the test network 300.

In this embodiment, the control center 200 includes a script resolving unit 210 and a resource allocating unit 220.

The script resolving unit 210 is in communication with the scheduling unit 130 and is configured for resolving the final description to produce the applicable network address and identification scheme.

Alternatively, to resolve the final description, the control center 200 may need to call source code through application programming interface (API). As such, the control center 200 can further include a calling unit 230. The calling unit 230 is in communication with the script resolving unit 210 and is configured for calling source code to resolve the final description. In this case, FIG. 3 shows an example of a pseudo code of identifier/locator mapping.

The resource allocating unit 220 is in communication with the script resolving unit 210 and the test network 300 and is configured for applying the applicable network address and identification scheme to the test network 300.

The test network 300 is in communication with the control center 200 and the measurement center 400 and is configured for implementing the applicable network address and identification scheme and running to allow measurements of running performance thereof.

In this embodiment, the test network 300 includes host and switches 310, a database server 320, and a mapping resolver 330, and cloud 340.

The host and switches 310 are in communication with the resource allocating unit 220 and is configured for implementing the applicable network address and identification scheme. The host and switches 310 are also configured for running to forward data.

The database server 320 is configured for storing data including mapping tables.

The mapping resolver 330 is in communication with the host and the switches 310 and the database server 320 and is configured for mapping addresses with identifiers of the host and the switches 310 using the mapping table.

The cloud 340 are in communication with the host and switches 310, the database server 320, and the mapping resolver 330, and are configured for providing supports of calculation and storage.

The measurement center 400 is in communication with the test network 300 and the managing and evaluating center 100, and is configured for measuring running performance of the test network 300, including performance and costs, and sending the measurements to the managing and evaluating center 100. As such, the managing and evaluating center 100 in addition includes an evaluating unit 140 in communication with the measurement center 400 and configured for evaluating performance and evolution ability of the network address and identification schemes based upon the measurements.

In this embodiment, the measurement center 400 includes a measuring unit 410 and an analyzing unit 420.

The measuring unit 410 is in communication with the host and switches 310, and is configured for measuring the running performance of the host and the switch 310.

The analyzing unit 420 is in communication with the measuring unit 410 and the evaluating unit 140 and is configured for analyzing the measurements and sending the analyzed measurements to the evaluating unit 140 for evaluating the performance and evolution ability of the network address and identification schemes and outputting the evaluation results to the users.

In operation, the formal descriptions of network address and identification schemes are received by the input unit 110. Then the validity and completeness of the formal descriptions are verified by the verifying unit 120. The network address and identification schemes are scheduled into a final description by the scheduling unit 130 after the validity and completeness of the formal descriptions are verified.

The final description is resolved into an applicable network address by the script resolving unit 210. Then the applicable network address and identification scheme is applied to a test network 300 and the test network 300 runs.

The running performance of the test network 300 is measured by the measuring unit 410. The measurements are analyzed and sent to the evaluating unit 140 by the analyzing unit 420.

Then the performance and evolution ability of the network address and identification schemes are evaluated based upon the analyzed measurements.

The above-described embodiments are intended to illustrate rather than limit the disclosure. Variations may be made to the embodiment without departing from the spirit of the disclosure as claimed. The above-described embodiments are intended to illustrate the scope of the disclosure and not restricted to the scope of the disclosure. Description and claims drawn to a method may include some indication in reference to certain steps. However, the indication used is only to be viewed for identification purposes and not as a suggestion as to an order for the steps.

What is claimed is:

1. A system, comprising:
   a processor; and
   a non-transitory computer-readable storage medium storing a program to be executed by the processor, the program including instructions for:
   receiving formal descriptions of network address and identification schemes;
   verifying validity and completeness of the formal descriptions;
   scheduling the network address and identification schemes into a final description after the validity and completeness of the formal descriptions are verified;
   resolving the final description into an applicable network address and identification scheme;
   applying the applicable network address and identification scheme to the test network to run the test network;
   measuring running performance of the test network;
   analyzing the measurements and sending the analyzed measurements; and
   evaluating performance and evolution ability of the network address and identification schemes based upon the analyzed measurements.

2. The system of claim 1, further comprising a user interface selected from the group consisting of a keyboard, a mouse, a touch panel, and any combination thereof.

3. The system of claim 1, wherein the network address and identification schemes are written under predetermined standards, and semantics and grammar rules, and the validity and completeness of the formal description is verified according to the predetermined standards, and semantics and grammar rules.

4. The system of claim 1, wherein the program further including instructions for: calling source code to resolve the final description.

5. The system of claim 1, wherein the program further including instructions for:
   implementing the applicable network address and identification scheme and running to transmit and forward data;
   storing data including mapping tables;
   mapping addresses with identifiers of the host and the switches using the mapping table; and
   providing supports of calculation and storage.

6. A method, comprising:
   receiving formal descriptions of network address and identification schemes;
   verifying validity and completeness of the formal descriptions;
   scheduling the network address and identification schemes into a final description after the validity and completeness of the formal descriptions are verified;
   resolving the final description into an applicable network address;
   applying the applicable network address and identification scheme to a test network and the test network running;
   measuring running performance of the test network; and
   analyzing the measurements and sending the analyzed measurements; and
   evaluating performance and evolution ability of the network address and identification schemes based upon the analyzed measurements.

7. The method of claim 6, wherein the network address and identification schemes are written under predetermined standards, and semantics and grammar rules, and the validity and completeness of each of the formal description are verified according to the predetermined standards, and semantics and grammar rules.

8. The method of claim 6, the step of resolving the final description into an applicable network address comprising utilizing a calling unit, in connection with a script resolving unit, configured for calling source code to resolve the final network address and identification scheme.

* * * * *